US010219254B2

(12) United States Patent
Wu et al.

(10) Patent No.: US 10,219,254 B2
(45) Date of Patent: Feb. 26, 2019

(54) AIRTIME-BASED PACKET SCHEDULING FOR WIRELESS NETWORKS

(71) Applicant: Aerohive Networks, Inc., Milpitas, CA (US)

(72) Inventors: Peter Wu, Saratoga, CA (US); Sreekanth Reddy, Edison, NJ (US); Jianlin Zeng, San Jose, CA (US); Changming Liu, Cupertino, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 0 days.

(21) Appl. No.: 15/865,027

(22) Filed: Jan. 8, 2018

(65) Prior Publication Data

US 2018/0152934 A1    May 31, 2018

Related U.S. Application Data

(63) Continuation of application No. 15/243,720, filed on Aug. 22, 2016, now Pat. No. 9,867,167, which is a (Continued)

(51) Int. Cl.
*H04L 12/26*    (2006.01)
*H04W 72/04*    (2009.01)
(Continued)

(52) U.S. Cl.
CPC ......... *H04W 72/0406* (2013.01); *H04L 47/24* (2013.01); *H04L 47/32* (2013.01);
(Continued)

(58) Field of Classification Search
None
See application file for complete search history.

(56) References Cited

U.S. PATENT DOCUMENTS

| 5,471,671 A | 11/1995 | Wang |
| 5,697,059 A | 12/1997 | Carney |

(Continued)

FOREIGN PATENT DOCUMENTS

| CN | 1642143 | 7/2005 |
| EP | 0940999 | 9/1999 |

(Continued)

OTHER PUBLICATIONS

Chirumamilla, Mohan K. et al., "Agent Based Intrustion Detection and Response System for Wireless LANs," CSE Conference and Workshop Papers, Paper 64, Jan. 1, 2003.

(Continued)

*Primary Examiner* — Zewdu A Beyen
(74) *Attorney, Agent, or Firm* — Sheppard, Mullin, Richter & Hampton LLP

(57) ABSTRACT

Airtime usage may be used as a factor in controlling network traffic flow to and from client devices via a wireless network interface. Received packets or other data are assigned to a quality of service profile. Additionally, a cost value for communicating the received data is determined at least in part based on an actual or estimated airtime usage for the received packet. The cost value is used to allocate wireless network airtime to data. The allocation of wireless network airtime may be varied dynamically based on operating conditions. The cost value may be based on factors including the airtime used to communicate data; whether the data is a retransmission; and wireless network overhead. The cost value of data may also be different depending on whether the data is being sent from a client device or to a client device.

18 Claims, 2 Drawing Sheets

Related U.S. Application Data continuation of application No. 14/250,294, filed on Apr. 10, 2014, now Pat. No. 9,572,135, which is a continuation of application No. 13/938,159, filed on Jul. 9, 2013, now Pat. No. 8,730,931, which is a continuation of application No. 12/356,886, filed on Jan. 21, 2009, now Pat. No. 8,483,194.

(51) Int. Cl.
  *H04W 72/12* (2009.01)
  *H04W 28/02* (2009.01)
  *H04W 24/08* (2009.01)
  *H04L 12/851* (2013.01)
  *H04L 12/823* (2013.01)

(52) U.S. Cl.
  CPC ....... *H04W 24/08* (2013.01); *H04W 28/0205* (2013.01); *H04W 72/1236* (2013.01); *H04W 72/1257* (2013.01)

(56) References Cited

U.S. PATENT DOCUMENTS

| | | |
|---|---|---|
| 5,726,984 A | 3/1998 | Kubler |
| 5,956,643 A | 9/1999 | Benveniste |
| 6,061,799 A | 5/2000 | Eldridge |
| 6,112,092 A | 8/2000 | Benveniste |
| 6,154,655 A | 11/2000 | Borst |
| 6,201,792 B1 | 3/2001 | Lahat |
| 6,233,222 B1 | 5/2001 | Wallentin |
| 6,314,294 B1 | 11/2001 | Benveniste |
| 6,473,413 B1 | 10/2002 | Chiou |
| 6,496,699 B2 | 12/2002 | Benveniste |
| 6,519,461 B1 | 2/2003 | Andersson |
| 6,628,623 B1 | 9/2003 | Noy |
| 6,628,938 B1 | 9/2003 | Rachabathuni |
| 6,636,498 B1 | 10/2003 | Leung |
| 6,775,549 B2 | 8/2004 | Benveniste |
| 6,865,393 B1 | 3/2005 | Baum |
| 6,957,067 B1 | 10/2005 | Iyer |
| 7,002,943 B2 | 2/2006 | Bhagwat |
| 7,057,566 B2 | 6/2006 | Theobold |
| 7,085,224 B1 | 8/2006 | Oran |
| 7,085,241 B1 | 8/2006 | O'Neill |
| 7,130,629 B1 | 10/2006 | Leung |
| 7,154,874 B2 | 12/2006 | Bhagwat |
| 7,164,667 B2 | 1/2007 | Rayment |
| 7,174,170 B2 | 2/2007 | Steer |
| 7,177,646 B2 | 2/2007 | O'Neill |
| 7,181,530 B1 | 2/2007 | Halasz |
| 7,216,365 B2 | 5/2007 | Bhagwat |
| 7,224,697 B2 | 5/2007 | Banerjea |
| 7,251,238 B2 | 7/2007 | Joshi |
| 7,336,670 B1 | 2/2008 | Calhoun |
| 7,339,914 B2 | 3/2008 | Bhagwat |
| 7,346,338 B1 | 3/2008 | Calhoun |
| 7,366,894 B1 | 4/2008 | Kalimuthu |
| 7,369,489 B1* | 5/2008 | Bhattacharya .......... H04L 47/10 370/230 |
| 7,370,362 B2 | 5/2008 | Olson |
| 7,440,434 B2 | 10/2008 | Chaskar |
| 7,512,379 B2 | 3/2009 | Nguyen |
| 7,536,723 B1 | 5/2009 | Bhagwat |
| 7,562,384 B1 | 7/2009 | Huang |
| 7,593,356 B1 | 9/2009 | Friday |
| 7,656,822 B1 | 2/2010 | AbdelAziz |
| 7,706,789 B2 | 4/2010 | Qi |
| 7,716,370 B1 | 5/2010 | Devarapalli |
| 7,751,393 B2 | 7/2010 | Chaskar |
| 7,768,952 B2 | 8/2010 | Lee |
| 7,793,104 B2 | 9/2010 | Zheng |
| 7,804,808 B2 | 9/2010 | Bhagwat |
| 7,843,907 B1 | 11/2010 | Abou-Emara |
| 7,844,057 B2 | 11/2010 | Meier |
| 7,856,209 B1 | 12/2010 | Rawat |
| 7,921,185 B2 | 4/2011 | Chawla |
| 7,949,342 B2 | 5/2011 | Cuffaro |
| 7,961,725 B2 | 6/2011 | Nagarajan |
| 7,970,894 B1 | 6/2011 | Patwardhan |
| 8,000,308 B2 | 8/2011 | Dietrich |
| 8,069,483 B1 | 11/2011 | Matlock |
| 8,219,688 B2 | 7/2012 | Wang |
| 8,249,606 B1 | 8/2012 | Neophytou |
| 8,493,918 B2 | 7/2013 | Karaoguz |
| 8,553,612 B2 | 10/2013 | Alexandre |
| 8,789,191 B2 | 7/2014 | Bhagwat |
| 8,824,448 B1 | 9/2014 | Narayana |
| 8,948,046 B2 | 2/2015 | Kang |
| 8,953,453 B1 | 2/2015 | Kiao |
| 9,003,527 B2 | 4/2015 | Bhagwat |
| 2001/0006508 A1 | 7/2001 | Pankaj |
| 2002/0012320 A1 | 1/2002 | Ogier |
| 2002/0021689 A1 | 2/2002 | Robbins |
| 2002/0041566 A1 | 4/2002 | Yang |
| 2002/0071422 A1 | 6/2002 | Amicangioli |
| 2002/0091813 A1 | 7/2002 | Lamberton |
| 2002/0114303 A1 | 8/2002 | Crosbie |
| 2002/0116463 A1 | 8/2002 | Hart |
| 2002/0128984 A1 | 9/2002 | Mehta |
| 2003/0005100 A1 | 1/2003 | Barnard |
| 2003/0039212 A1 | 2/2003 | Lloyd |
| 2003/0084104 A1 | 5/2003 | Salem |
| 2003/0087629 A1 | 5/2003 | Juitt |
| 2003/0104814 A1 | 6/2003 | Gwon |
| 2003/0129988 A1 | 7/2003 | Lee |
| 2003/0145091 A1 | 7/2003 | Peng |
| 2003/0179742 A1 | 9/2003 | Ogier |
| 2003/0198207 A1* | 10/2003 | Lee .................. H04W 72/1247 370/337 |
| 2004/0003285 A1 | 1/2004 | Whelan |
| 2004/0013118 A1 | 1/2004 | Borella |
| 2004/0022222 A1 | 2/2004 | Clisham |
| 2004/0054774 A1 | 3/2004 | Barber |
| 2004/0064467 A1 | 4/2004 | Kola |
| 2004/0077341 A1 | 4/2004 | Chandranmenon |
| 2004/0103282 A1 | 5/2004 | Meier |
| 2004/0109466 A1 | 6/2004 | Van Ackere |
| 2004/0162037 A1 | 8/2004 | Shpak |
| 2004/0185876 A1 | 9/2004 | Groenendaal |
| 2004/0192312 A1 | 9/2004 | Li |
| 2004/0196977 A1 | 10/2004 | Johnson |
| 2004/0236939 A1 | 11/2004 | Watanabe |
| 2004/0255028 A1 | 12/2004 | Chu |
| 2005/0053003 A1 | 3/2005 | Cain |
| 2005/0074015 A1 | 4/2005 | Chari |
| 2005/0085235 A1 | 4/2005 | Park |
| 2005/0099983 A1 | 5/2005 | Nakamura |
| 2005/0122946 A1 | 6/2005 | Won |
| 2005/0154774 A1 | 7/2005 | Giaffreda |
| 2005/0207417 A1 | 9/2005 | Ogawa |
| 2005/0259682 A1 | 11/2005 | Yosef |
| 2005/0262266 A1 | 11/2005 | Wiberg |
| 2005/0265288 A1 | 12/2005 | Liu |
| 2005/0266848 A1 | 12/2005 | Kim |
| 2006/0010250 A1 | 1/2006 | Eisl |
| 2006/0013179 A1 | 1/2006 | Yamane |
| 2006/0026289 A1 | 2/2006 | Lyndersay |
| 2006/0062250 A1 | 3/2006 | Payne, III |
| 2006/0107050 A1 | 5/2006 | Shih |
| 2006/0117018 A1 | 6/2006 | Christiansen |
| 2006/0140123 A1 | 6/2006 | Conner |
| 2006/0146748 A1 | 7/2006 | Ng |
| 2006/0146846 A1 | 7/2006 | Yarvis |
| 2006/0165015 A1 | 7/2006 | Melick |
| 2006/0187949 A1 | 8/2006 | Seshan |
| 2006/0221920 A1 | 10/2006 | Gopalakrishnan |
| 2006/0233128 A1 | 10/2006 | Sood |
| 2006/0234701 A1 | 10/2006 | Wang |
| 2006/0245442 A1 | 11/2006 | Srikrishna |
| 2006/0251256 A1 | 11/2006 | Asokan |
| 2006/0268802 A1 | 11/2006 | Faccin |
| 2006/0294246 A1 | 12/2006 | Stieglitz |
| 2007/0004394 A1 | 1/2007 | Chu |

(56) References Cited

U.S. PATENT DOCUMENTS

| | | |
|---|---|---|
| 2007/0010231 A1 | 1/2007 | Du |
| 2007/0025274 A1 | 2/2007 | Rahman |
| 2007/0025298 A1 | 2/2007 | Jung |
| 2007/0030826 A1 | 2/2007 | Zhang |
| 2007/0049323 A1 | 3/2007 | Wang |
| 2007/0077937 A1 | 4/2007 | Ramakrishnan |
| 2007/0078663 A1 | 4/2007 | Grace |
| 2007/0082656 A1 | 4/2007 | Stieglitz |
| 2007/0087756 A1 | 4/2007 | Hoffberg |
| 2007/0091859 A1 | 4/2007 | Sethi |
| 2007/0115847 A1 | 5/2007 | Strutt |
| 2007/0116011 A1 | 5/2007 | Lim |
| 2007/0121947 A1 | 5/2007 | Sood |
| 2007/0133407 A1 | 6/2007 | Choi |
| 2007/0140191 A1 | 6/2007 | Kojima |
| 2007/0150720 A1 | 6/2007 | Oh |
| 2007/0153697 A1 | 7/2007 | Kwan |
| 2007/0153741 A1 | 7/2007 | Blanchette |
| 2007/0156804 A1 | 7/2007 | Mo |
| 2007/0160017 A1 | 7/2007 | Meier |
| 2007/0171885 A1 | 7/2007 | Bhagwat |
| 2007/0192862 A1 | 8/2007 | Vermeulen |
| 2007/0195761 A1 | 8/2007 | Tatar |
| 2007/0206552 A1 | 9/2007 | Yaqub |
| 2007/0247303 A1 | 10/2007 | Payton |
| 2007/0248014 A1 | 10/2007 | Xie |
| 2007/0249324 A1 | 10/2007 | Jou |
| 2007/0263532 A1 | 11/2007 | Mirtorabi |
| 2007/0280481 A1 | 12/2007 | Eastlake |
| 2007/0288997 A1 | 12/2007 | Meier |
| 2008/0002642 A1 | 1/2008 | Borkar |
| 2008/0022392 A1 | 1/2008 | Karpati |
| 2008/0037552 A1 | 2/2008 | Dos Remedios |
| 2008/0080369 A1 | 4/2008 | Sumioka |
| 2008/0080377 A1 | 4/2008 | Sasaki |
| 2008/0090575 A1 | 4/2008 | Barak |
| 2008/0095094 A1 | 4/2008 | Innami |
| 2008/0095163 A1 | 4/2008 | Chen |
| 2008/0107027 A1 | 5/2008 | Allan |
| 2008/0109879 A1 | 5/2008 | Bhagwat |
| 2008/0130495 A1 | 6/2008 | Dos Remedios |
| 2008/0146240 A1 | 6/2008 | Trudeau |
| 2008/0151751 A1 | 6/2008 | Ponnuswamy |
| 2008/0159128 A1 | 7/2008 | Shaffer |
| 2008/0159135 A1 | 7/2008 | Caram |
| 2008/0170527 A1 | 7/2008 | Lundsgaard |
| 2008/0186932 A1 | 8/2008 | Do |
| 2008/0194271 A1 | 8/2008 | Bedekar |
| 2008/0207215 A1 | 8/2008 | Chu |
| 2008/0209186 A1 | 8/2008 | Boden |
| 2008/0212562 A1 | 9/2008 | Bedekar |
| 2008/0219286 A1 | 9/2008 | Ji |
| 2008/0225857 A1 | 9/2008 | Lange |
| 2008/0229095 A1 | 9/2008 | Kalimuthu |
| 2008/0240128 A1 | 10/2008 | Elrod |
| 2008/0253370 A1 | 10/2008 | Cremin |
| 2008/0273520 A1 | 11/2008 | Kim |
| 2008/0279161 A1 | 11/2008 | Stirbu |
| 2009/0019521 A1 | 1/2009 | Vasudevan |
| 2009/0028052 A1 | 1/2009 | Strater |
| 2009/0040989 A1 | 2/2009 | da Costa |
| 2009/0043901 A1 | 2/2009 | Mizikovsky |
| 2009/0082025 A1 | 3/2009 | Song |
| 2009/0088152 A1 | 4/2009 | Orlassino |
| 2009/0097436 A1 | 4/2009 | Vasudevan |
| 2009/0111468 A1 | 4/2009 | Burgess |
| 2009/0113018 A1 | 4/2009 | Thomson |
| 2009/0141692 A1 | 6/2009 | Kasslin |
| 2009/0144740 A1 | 6/2009 | Gao |
| 2009/0168645 A1 | 7/2009 | Tester |
| 2009/0172151 A1 | 7/2009 | Davis |
| 2009/0197597 A1 | 8/2009 | Kotecha |
| 2009/0207806 A1 | 8/2009 | Makela |
| 2009/0239531 A1 | 9/2009 | Andreasen |
| 2009/0240789 A1 | 9/2009 | Dandabany |
| 2009/0247170 A1 | 10/2009 | Balasubramanian |
| 2009/0303883 A1 | 12/2009 | Kucharczyk |
| 2009/0310557 A1 | 12/2009 | Shinozaki |
| 2010/0020753 A1 | 1/2010 | Fulknier |
| 2010/0046368 A1 | 2/2010 | Kaempfer |
| 2010/0057930 A1 | 3/2010 | DeHaan |
| 2010/0061234 A1 | 3/2010 | Pai |
| 2010/0067379 A1 | 3/2010 | Zhao |
| 2010/0112540 A1 | 5/2010 | Gross |
| 2010/0115278 A1 | 5/2010 | Shen |
| 2010/0115576 A1 | 5/2010 | Hale |
| 2010/0132040 A1 | 5/2010 | Bhagwat |
| 2010/0195585 A1 | 8/2010 | Horn |
| 2010/0208614 A1 | 8/2010 | Harmatos |
| 2010/0228843 A1 | 9/2010 | Ok |
| 2010/0240313 A1 | 9/2010 | Kawai |
| 2010/0254316 A1 | 10/2010 | Sendrowicz |
| 2010/0260091 A1 | 10/2010 | Seok |
| 2010/0290397 A1 | 11/2010 | Narayana |
| 2010/0304738 A1 | 12/2010 | Lim |
| 2010/0311420 A1 | 12/2010 | Reza |
| 2010/0322217 A1 | 12/2010 | Jin |
| 2010/0325720 A1 | 12/2010 | Etchegoyen |
| 2011/0004913 A1 | 1/2011 | Nagarajan |
| 2011/0040867 A1 | 2/2011 | Kalbag |
| 2011/0051677 A1 | 3/2011 | Jetcheva |
| 2011/0055326 A1 | 3/2011 | Michaelis |
| 2011/0055928 A1 | 3/2011 | Brindza |
| 2011/0058524 A1 | 3/2011 | Hart |
| 2011/0064065 A1 | 3/2011 | Nakajima |
| 2011/0085464 A1 | 4/2011 | Nordmark |
| 2011/0182225 A1 | 7/2011 | Song |
| 2011/0185231 A1 | 7/2011 | Balestrieri |
| 2011/0258641 A1 | 10/2011 | Armstrong |
| 2011/0292897 A1 | 12/2011 | Wu |
| 2012/0014386 A1 | 1/2012 | Xiong |
| 2012/0290650 A1 | 11/2012 | Montuno |
| 2013/0003729 A1 | 1/2013 | Raman |
| 2013/0003739 A1 | 1/2013 | Raman |
| 2013/0003747 A1 | 1/2013 | Raman |
| 2013/0028158 A1 | 1/2013 | Lee |
| 2013/0059570 A1 | 3/2013 | Hara |
| 2013/0086403 A1 | 4/2013 | Jenne |
| 2013/0103833 A1 | 4/2013 | Ringland |
| 2013/0227306 A1 | 8/2013 | Santos |
| 2013/0230020 A1 | 9/2013 | Backes |
| 2013/0250811 A1 | 9/2013 | Vasseur |
| 2014/0269327 A1 | 9/2014 | Fulknier |
| 2014/0298467 A1 | 10/2014 | Bhagwat |
| 2015/0120864 A1 | 4/2015 | Unnimadhavan |

FOREIGN PATENT DOCUMENTS

| | | |
|---|---|---|
| EP | 1732276 | 12/2006 |
| EP | 1771026 | 4/2007 |
| EP | 1490773 | 1/2013 |
| WO | 0059251 | 10/2000 |
| WO | 0179992 | 10/2001 |
| WO | 2004042971 | 5/2004 |
| WO | 2006129287 | 12/2006 |
| WO | 2009141016 | 11/2009 |

OTHER PUBLICATIONS

Clausen, T., et al., "Optimized Link State Routing Protocol (OLSR)," Network Working Group, pp. 1-71, Oct. 2003.

Craiger, J. Philip, "802.11, 802.1x, and Wireless Security," SANS Institute InfoSec Reading Room, Jun. 23, 2002.

Finlayson, Ross et al., "A Reverse Address Resolution Protocol," Nework Working Group, Request for Comments: 903 (RFC 903), Jun. 1984.

He, Changhua et al., "Analysis of the 802.11i 4-Way Handshake," Proceedings of the 3rd ACM Workshop on Wireless Security, pp. 43-50, Oct. 2004.

IEEE Computer Society, "IEEE Std 802.11i—Part 11: Wireless LAN Medium Access Control (MAC) and Physical Layer (PHY) Specifications—Amendment 6: Medium Access Control (MAC) Security Enhancements," Section H.4.1, pp. 165-166, Jul. 23, 2014.

(56) References Cited

OTHER PUBLICATIONS

Lee, Jae Woo et al, "z2z: Discovering Zeroconf Services Beyond Local Link," 2007 IEEE Globecom Workshops, pp. 1-7, Nov. 26, 2007.
Perkins, C., et al., "Ad hoc On-Demand Distance Vector (AODV) Routing," Network Working Group, pp. 1-35, Oct. 2003.
Wu, Haitao et al., "Layer 2.5 SoftMAC: End-System Based Media Streaming Support on Home Networks," IEEE Global Telecommunications Conference (GLOBECOM '05), vol. 1, pp. 235-239, Nov. 2005.
European Patent Application No. 11823931.8, Search Report dated Aug. 29, 2016.
European Patent Application No. 12879114.2, Search Report dated Jan. 21, 2016.
International Application No. PCT/US2008/061674, International Search Report and Written Opinion dated Oct. 14, 2008.
International Application No. PCT/US2011/047591, International Search Report and Written Opinion dated Dec. 19, 2011.
International Application No. PCT/US2012/059093, International Search Report and Written Opinion dated Jan. 4, 2013.
Cisco Systems, Inc., "Wi-Fi Protected Access 2 (WPA 2) Configuration Example," Document ID 67134, Jan. 21, 2008 [retrieved online at https://www.cisco.com/c/en/us/support/docs/wireless-mobility/wireless-lan-wlan/67134-wpa2-config.html on Dec. 4, 2018].

* cited by examiner

AIRTIME-BASED PACKET SCHEDULING FOR WIRELESS NETWORKS

CROSS REFERENCE TO RELATED APPLICATIONS

This application is a continuation of U.S. patent application Ser. No. 15/243,720, filed on Aug. 22, 2016, which is a continuation of U.S. patent application Ser. No. 14/250,294, filed on Apr. 10, 2014, now U.S. Pat. No. 9,572,135, which is a continuation of U.S. patent application Ser. No. 13/938,159, filed on Jul. 9, 2013, now U.S. Pat. No. 8,730,931, which is a continuation of U.S. patent application Ser. No. 12/356,886, filed on Jan. 21, 2009, now U.S. Pat. No. 8,483,194, all of which are incorporated by reference herein.

BACKGROUND

This application is related to the field of wireless networking devices, and in particular to systems and methods for controlling network traffic to and from clients. Networking devices enable data communications between two or more devices, referred to generally as clients. Data communications may be conducted over wired and/or wireless network interfaces. Typically, data is partitioned into packets, which are then communicated via one or more networking devices to one or more destination clients.

Networking devices may handle packets generated by and directed to large numbers of clients over the same interface. The bandwidth or data communications capacity of networking devices limits the amount of data or the rate of network packets passing through network devices. The limits on bandwidth are particularly acute in network devices including wireless network interfaces. If the bandwidth limit of a networking device is reached or exceeded by its client's network traffic, packets may be delayed or dropped. Depending on the type of data being communicated over the network, these traffic disruptions caused by reaching or exceeding bandwidth limit of a networking device may adversely affect the performance of applications on a client. For example, clients receiving voice or streaming video data may be adversely affected by even small delays or losses of packets.

Because of the limits on network device bandwidth, many network devices include quality of service (QoS) functionality. Quality of service functionality allows network administrators to provide different priority for packets or other network data based on factors such as the associated client, user, client application, or data flow. Typically, users, clients, or applications are assigned to different quality of service profiles. Each quality of service profile specifies a quality of service parameters to associated packets or other network data. Networking devices use the scheduling weights to prioritize packet traffic and potentially guarantee a minimum level of performance to some or all of the network data flows.

However, typical quality of service functionality does not take into consideration performance issues unique to wireless network interfaces. For example, many wireless network interfaces support multiple wireless networking standards, such as IEEE 802.11a, 802.11b, 802.11g, and 802.11n. This allows the networking device to support legacy clients using slower (e.g. relatively low data-rate) standards, such as 802.11b, as well as newer clients capable of communicating via faster (e.g. relatively high data-rate) standards, such as 802.11n. When a networking device is operating in a mixed mode and communicating with clients via multiple standards, the clients using slower data rates, such as clients using older standards or newer standards at lower data rates, for example due to lower signal strength or radio interference, will consume a disproportionate amount of airtime from the wireless network interface. As a result of this disproportionate airtime usage, the performance of other clients attempting to utilize faster data rates will be degraded substantially.

SUMMARY

An embodiment of the invention includes airtime usage as a factor in controlling network traffic flow to and from client devices via a wireless network interface. In an embodiment, packets or other data received via a wired or wireless network interface and directed to a client device or received from a client via a wireless network interface are assigned to a quality of service profile. Additionally, a cost value for communicating the packet or other data is determined at least in part based on an actual or estimated airtime usage for the packet to be communicated to or from the client via a wireless network interface. The cost value is used to allocate wireless network airtime to clients. In a further embodiment, the consumption of wireless network airtime may be varied dynamically based on operating conditions.

In an embodiment, the cost value may be based on factors including the actual or estimated airtime used to communicate the packet via the wireless network interface; whether the packet or other data is a retransmission of a previous packet or other data; and actual or estimated wireless network overhead. The cost value of a packet may also be different depending on whether the packet is being sent from a client device or to a client device.

In an embodiment, a token bucket scheduling system is used to allocate wireless network bandwidth based on received packets' cost values and token balances associated with quality of service profiles. In a further embodiment, packets or other data received from a client device via a wireless network interface may be dropped or discarded if a queue associated with a quality of service is full.

DETAILED DESCRIPTION

Figure 1:
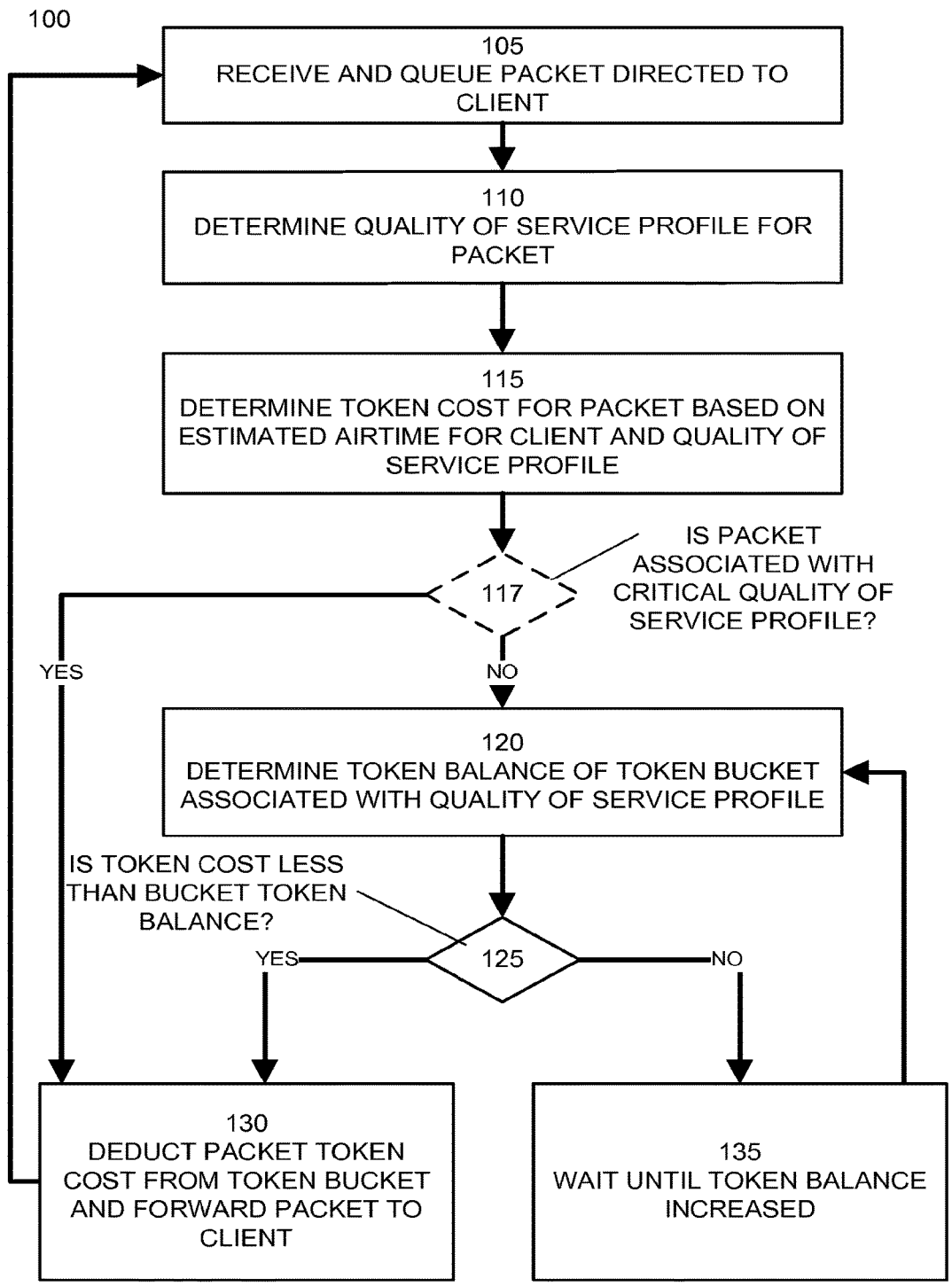
FIG. 1 illustrates a flowchart of an example of a method of scheduling downlink network traffic according to an embodiment of the invention.

FIG. 1 illustrates a flowchart 100 of an example of a method of scheduling downlink network traffic according to an embodiment of the invention. In this application, downlink network traffic refers to network traffic received by a network device via a wired or wireless network connection and directed to a client device via a wireless network connection. In step 105, a packet or other type of network data is received by a network device. In an embodiment, the packet is directed to a client device in direct or indirect communication with the network device via a wireless network connection. For example, the network device may be adapted to communicate the packet directly to the client device via a wireless network connection or to one or more additional network devices via the wireless network connection, which in turn communicate the packet to the client device via a wired or wireless network connection.

Step 110 determines a quality of service profile to be associated with the received packet. Embodiments of step 110 may assign a quality of service profile to packets based on the packet source, the packet destination, a user identity or user class associated with the packet source and/or packet destination, the contents or control data associated with a packet, a source or client application associated with a packet, and/or a data flow associated with the packet. The set of quality of service profiles may be specified by network administrators. As described in detail below, each quality of service profile is assigned a scheduling weight and a scheduling mode used to prioritize packets. In further embodiments, a quality of service profile may include a per-user rate limit.

Step 115 determines a token cost for the received packet based on factors including an estimated airtime for the packet and the quality of service profile. In an embodiment, packets are assigned a cost value, referred to as a token cost. The token cost represents the relative amount of network performance consumed by communicating the associated packet towards the intended destination by the network device.

Embodiments of step 115 take into account at least an estimated packet airtime to determine the token cost of the received packet. In an embodiment, step 115 estimates the airtime to communicate the received packet from the network device to the client based on the airtime required by previous packets to the same client, similar clients, and/or clients assigned to the same quality of service profile. For example, a running average of the airtime consumed by one or more of the most-recently sent packets to the same client may be used to determine at least a portion of the estimated packet airtime for the currently received packet.

In a further embodiment, the average airtime of recently sent packets is weighted or divided by their respective packet sizes to determine an average airtime consumed per data unit, such as average airtime consumed per byte. This average airtime consumed per data unit may then be scaled or weighted according the size of the received packet to determine at least a portion of the estimated airtime for the currently received packet. This enables the token cost of a packet to increase with the packet size, as larger packets consume more network bandwidth.

In addition to estimating the airtime consumed in transmitting the packet, an embodiment of step 115 may also include other factors in determining the token cost of a packet. The token cost or total estimated airtime may include an estimated airtime for transmitting a packet to the client, the actual, estimated, or prorated airtime used for retransmitting packets that were previously unsuccessfully transmitted, and/or some or all of the network overhead.

Optional decision block 117 may determine if the packet is associated with a critical quality of service profile. In an embodiment, users, user groups, and/or the types of applications associated with a packet may be assigned to a critical quality of service profile if any delay in forwarding the packet is unacceptable. For example, packets from voice-over IP (VOIP) and live video applications may be assigned to a critical quality of service profile. If a packet is associated with a critical quality of service profile, method 100 proceeds directly from decision block 117 to step 130 to forward the packet to its destination. However, as described in detail below, step 130 may deduct the token cost of this critical packet from a token bucket associated with the application, user group, or individual user. This has the effect of potentially limiting the airtime of any future non-critical packets from the same application, user group, or user.

Step 120 determines a token balance of a token bucket associated with the selected quality of service profile. In an embodiment, each quality of service profile is associated with its own token bucket. A token bucket is a data structure including a token balance value. The token balance value represents the unused proportion of the network bandwidth assigned to a quality of service profile. Token costs and token balance values may be expressed in arbitrary units.

In an embodiment, the token balance value of each token bucket is periodically increased or incremented, representing additional network bandwidth allocated to the associated quality of service profile for a period of time. In an embodiment, a scheduling weight associated with a quality of service profile is used to determine the rate or amount by which the token balance value of the token bucket is increased. For example, the token balance value of a token bucket associated with a higher priority quality of service profile may be incremented more frequently and/or by larger amounts. This has the effect of allocating more network bandwidth to packets associated with the high priority quality of service profile. In an alternate embodiment, each token bucket has its token balance value incremented by the same amount and at the same frequency.

In further embodiments, the range of the token balance value of each token bucket may be limited between a maximum token balance value and/or a minimum token balance value. The token increment value, token balance incrementing rate, and the minimum and maximum token balance limits of each token bucket may be specified based on the associated quality of service profile and optionally one or more other quality of service profiles. In a further embodiment, the token increment value, token balance incrementing rate, the minimum and maximum token balance limits of each token bucket, or any other factor affecting the allocation of wireless networking airtime may be dynamically specified based on the performance of the wireless network interface.

Decision block 125 compares the token cost of the received packet with the token balance value of the associated token bucket. If the token cost of the received packet is less than the token balance of the token bucket corresponding with the assigned quality of service profile, then method 100 proceeds to step 130.

Step 130 deducts the token cost from the token balance of the associated token bucket and forwards the packet to the client via the wireless network interface. By deducting the token cost from the token balance of the token bucket, the token balance reflects the relative proportion of the wireless network interface's bandwidth that has been used by the assigned quality of service profile. The packet may be communicated to the client device using any wireless networking standard or technique known in the art. In a further embodiment, the network device may communicate with multiple clients using different wireless networking standards or techniques, depending on the client capabilities and/or operating conditions. Following step 130, flowchart 100 optionally proceeds back to step 105 to await the receipt of another packet directed to the same or a different client.

In a further embodiment, step 130 deducts the token cost from the token balance value of the associated token bucket in two phases. First, step 130 deducts the token cost based at least partly on an estimated airtime for the received packet. Step 130 then forwards the packet to the client device via the wireless network interface. Additionally, step 130 monitors the transmission of this packet towards the client to determine its actual airtime usage. Step 130 then uses this actual airtime usage to determine a revised token cost for the received packet. Step 130 then subtracts the difference between the revised token cost and the original token cost of the packet from the token balance value of the token bucket. This adjustment may increase or decrease the token balance value of the token bucket, depending on whether the actual airtime usage of the packet is less than or greater than the estimated airtime, respectively.

Returning to decision block 125, if the token cost of the received packet is greater than the token balance of the token bucket corresponding with the assigned quality of service profile, then method 100 proceeds to step 135. Step 135 queues the received packet associated with this quality of service profile until the token balance of its associated token bucket is increased. Following the increase of the token balance of the token bucket associated with the quality of service profile assigned to the received packet, an embodiment of method 100 proceeds back to step 120. Steps 120, 125, and step 135 may be repeated one or more times until the token cost of the queued packet is less than the token balance of the token bucket. In an embodiment, while a packet is queued in step 135, other packets may be received and processed according to flowchart 100.

Although described with reference to downlink network traffic from a network device to a client device, embodiments of the method of flowchart 100 may also be applied to scheduling uplink network traffic from a client device to a network device via a wireless network interface. In this embodiment, the method of flowchart 100 operates in a similar manner as described above. However, the actual airtime of the received uplink packet is already known, eliminating the need to use an estimated airtime to determine at least part of the token cost.

As described above, a packet may be assigned to a critical quality of service profile if any delay in forwarding the packet is unacceptable. In an embodiment, step 130 deducts the token cost of these packets from the token balance of the associated token bucket, similar to other packets associated with non-critical quality of service profiles. However, because packets assigned to critical quality of service profiles bypass steps 120, 125, and 135, the token balance of a token bucket may become negative due to packets in critical quality of service profiles. In an embodiment, a negative token balance will not block further communications of packets associated with critical quality of service profiles. However, other packets associated with the same token bucket, such as packets for the same user, user group, and/or application, will be queued until the token balance of the token bucket increases. In a further embodiment, a token bucket may have a negative limit. When the token balance reaches the negative limit, packets associated with this token bucket may be dropped.

Although the flowchart 100 includes token costs and token buckets for controlling network traffic based at least in part on airtime usage, embodiments of the invention can include airtime usage as a factor controlling network traffic using any other network traffic shaping, bandwidth throttling, rate limiting, or quality of service technique known in the art.

Figure 2:
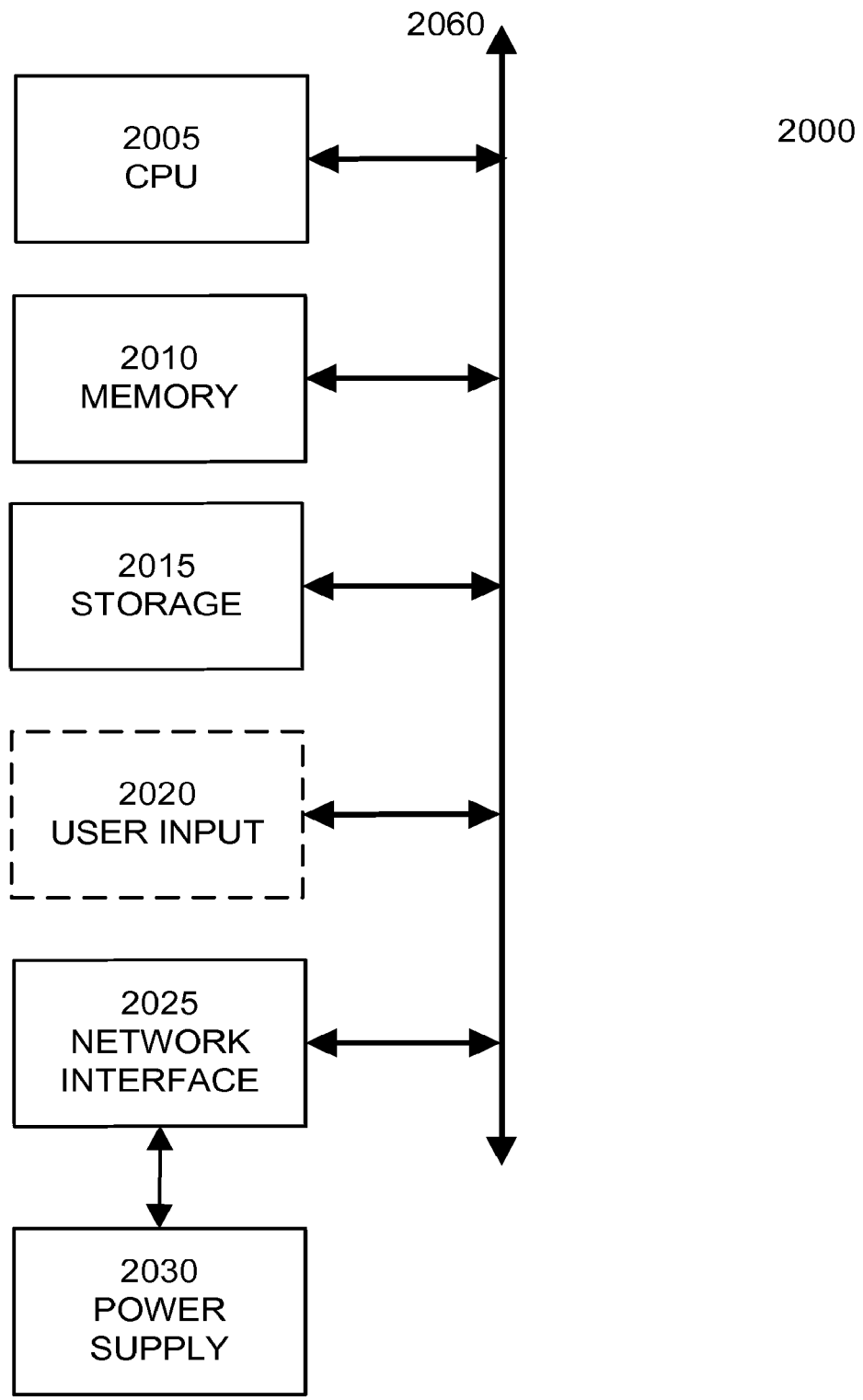
FIG. 2 illustrates a diagram of an example computer system suitable for implementing an embodiment of the invention.

FIG. 2 illustrates a diagram 2000 of an example computer system suitable for implementing an embodiment of the invention. FIG. 2 is a block diagram of a computer system, such as a personal computer or other digital device, suitable for practicing an embodiment of the invention. Embodiments of computer system may include dedicated networking devices, such as wireless access points, network switches, hubs, routers, hardware firewalls, network traffic optimizers and accelerators, network attached storage devices, and combinations thereof.

The diagram 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and the computer system may present a user interface to a user over a network, for example using a web page or network management protocol and network management software applications.

The diagram 2000 includes one or more network interfaces 2025 that allow computer system to communicate with other computer systems via an electronic communications network, and may include wired or wireless communication over local area networks and wide area networks such as the Internet. The computer system may support a variety of networking protocols at one or more levels of abstraction. For example, the computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system of the diagram 2000 may also include a wired networking interface, such as one or more Ethernet connections to communicate with other networking devices via local or wide-area networks. In a further embodiment, the computer system may be capable of receiving some or all of its required electrical power via the network interface 2025, for example using a wired networking interface power over Ethernet system.

The components of the computer system of the diagram 2000, including CPU 2005, memory 2010, data storage 2015, user input devices 2020, and network interface 2025 are connected via one or more data buses 2060. Additionally, some or all of the components of the computer system, including CPU 2005, memory 2010, data storage 2015, user input devices 2020, and network interface 2025 may be integrated together into one or more integrated circuits or integrated circuit packages. Furthermore, some or all of the components of the diagram 2000 may be implemented as application specific integrated circuits (ASICS) and/or programmable logic.

A power supply 2030 provides electrical power to the computer system of the diagram 2000. Power supply 2030 may be adapted to draw electrical power from a connection with an electrical power distribution grid. In an embodiment, power supply 2030 is connected with network interface 2025 to draw electrical power for the computer system from one or more wired network connections using a network power standard, such as IEEE 802.3af.

Further embodiments can be envisioned to one of ordinary skill in the art after reading the attached documents. For example, embodiments of the invention can be used with any number of network connections and may be added to any type of power supply in addition to the stacked network power supply illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
    receiving first and second data packets as part of network traffic of a network destined for one or more wireless devices accessing the network through a wireless connection;
    determining a first quality of service profile associated with the first data packet and a second quality of service profile associated with the second data packet;
    determining a first token cost of transmitting the first data packet and a second token cost of transmitting the second data packet based on estimated airtime for transmitting the first and second data packets, respectively;
    determining a first token balance of the first quality of service profile and a second token balance of the second quality of service profile, the first and second token balances being an amount of network bandwidth of the network allocated to the first and second quality of service profiles, respectively;
    determining whether the first and second token costs exceed the first and second token balances, respectively;
    upon determining that the first token cost does not exceed the first token balance, deducting the first token cost from the first token balance and forwarding the first data packet to a wireless device;
    upon determining that the second token cost does not exceed the second token balance, deducting the second token cost from the second token balance and forwarding the second data packet to a wireless device;
    periodically performing increase of the first and second token balances, respectively, an increase rate of the first token balance being greater than an increase rate of the second token balance;
    receiving a third data packet as part of network traffic of the network destined for a wireless device accessing the network through a wireless connection;
    determining a third quality of service profile associated with the third data packet;
    determining a third token cost of transmitting the third data packet based on estimated airtime for transmitting the third data packet;
    deducting the third token cost from a third token balance of the third quality of service profile and forwarding the third data packet to a wireless device, irrespective of whether or not the third token cost exceeds the third token balance.

2. The method of claim 1, wherein a frequency of the increase of the first token balance is greater than a frequency of the increase of the second token balance.

3. The method of claim 1, wherein an amount of the increase of the first token balance is greater than an amount of the increase of the second token balance.

4. The method of claim 1, wherein the first and second token balances both have a maximum token balance limit to which the token balance is allowed to be increased, and a maximum token balance limit of the first token balance is different from a maximum token balance limit of the second token balance.

5. The method of claim 1, further comprising:
    determining a revised first token cost based on actual airtime usage in forwarding the first data packet, and adjusting the first token balance based on a difference between the first token cost and the revised first token cost;
    determining a revised second token cost based on actual airtime usage in forwarding the second data packet, and adjusting the second token balance based on a difference between the second token cost and the revised second token cost.

6. The method of claim 1, further comprising:
    when the third token balance after deducting the third token cost reaches a negative limit, dropping the third data packet;
    when the third token balance after deducting the third token cost does not reach the negative limit, forwarding the third data packet to a wireless device.

7. The method of claim 1, wherein the first and second quality of service profiles are determined based on first and second wireless networking standards used for communication of the first and second data packets, respectively, wherein the first wireless networking standard supports faster data communication than the second wireless networking standard.

8. The method of claim 1, wherein the network traffic is downlink network traffic.

9. The method of claim 1, wherein the determining the first token cost of transmitting the first data packet and the second token cost of transmitting the second data packet comprises:
    determining airtimes to transmit previously sent data packets associated with the first quality of service profile and data sizes thereof;
    determining a first average airtime consumed per data unit based on the airtimes to transmit previously sent data packets associated with the first quality of service profile and the data sizes thereof;
    determining the estimated airtime for transmitting the first data packet based on the first average air time consumed per data unit and a data size of the first data packet;
    determining airtimes to transmit previously sent data packets associated with the second quality of service profile and data sizes thereof;
    determining a second average airtime consumed per data unit based on the airtimes to transmit previously sent data packets associated with the second quality of service profile and the data sizes thereof;
    determining the estimated airtime for transmitting the second data packet based on the second average air time consumed per data unit and a data size of the second data packet.

10. A system comprising:
    a processor;

memory storing instructions configured to instruct the processor to:
- receive first and second data packets as part of network traffic of a network destined for one or more wireless devices accessing the network through a wireless connection;
- determine a first quality of service profile associated with the first data packet and a second quality of service profile associated with the second data packet;
- determine a first token cost of transmitting the first data packet and a second token cost of transmitting the second data packet based on estimated airtime for transmitting the first and second data packets, respectively;
- determine a first token balance of the first quality of service profile and a second token balance of the second quality of service profile, the first and second token balances being an amount of network bandwidth of the network allocated to the first and second quality of service profiles, respectively;
- determine whether the first and second token costs exceed the first and second token balances, respectively;
- upon determining that the first token cost does not exceed the first token balance, deduct the first token cost from the first token balance and forward the first data packet to a wireless device;
- upon determining that the second token cost does not exceed the second token balance, deduct the second token cost from the second token balance and forward the second data packet to a wireless device;
- periodically perform increase of the first and second token balances, respectively, an increase rate of the first token balance being greater than an increase rate of the second token balance;
- receive a third data packet as part of network traffic of the network destined for a wireless device accessing the network through a wireless connection;
- determine a third quality of service profile associated with the third data packet;
- determine a third token cost of transmitting the third data packet based on estimated airtime for transmitting the third data packet;
- deduct the third token cost from a third token balance of the third quality of service profile and forward the third data packet to a wireless device, irrespective of whether or not the third token cost exceeds the third token balance.

11. The system of claim 10, wherein a frequency of the increase of the first token balance is greater than a frequency of the increase of the second token balance.

12. The system of claim 10, wherein an amount of the increase of the first token balance is greater than an amount of the increase of the second token balance.

13. The system of claim 10, wherein the first and second token balances both have a maximum token balance limit to which the token balance is allowed to be increased, and a maximum token valance limit of the first token balance is different from a maximum token balance limit of the second token balance.

14. The system of claim 10, wherein the instructions are further configured to instruct the processor to:
- determine a revised first token cost based on actual airtime usage in forwarding the first data packet, and adjust the first token balance based on a difference between the first token cost and the revised first token cost;
- determine a revised second token cost based on actual airtime usage in forwarding the second data packet, and adjust the second token balance based on a difference between the second token cost and the revised second token cost.

15. The system of claim 10, wherein the instructions are further configured to instruct the processor to:
- when the third token balance after deducting the third token cost reaches a negative limit, drop the third data packet;
- when the third token balance after deducting the third token cost does not reach the negative limit, forward the third data packet to a wireless device.

16. The system of claim 10, wherein the first and second quality of service profiles are determined based on first and second wireless networking standards used for communication of the first and second data packets, respectively, wherein the first wireless networking standard supports faster data communication than the second wireless networking standard.

17. The system of claim 10, wherein the network traffic is downlink network traffic.

18. The system of claim 10, wherein the instructions are further configured to instruct the processor to:
- determine airtimes to transmit previously sent data packets associated with the first quality of service profile and data sizes thereof;
- determine a first average airtime consumed per data unit based on the airtimes to transmit previously sent data packets associated with the first quality of service profile and the data sizes thereof;
- determine the estimated airtime for transmitting the first data packet based on the first average air time consumed per data unit and a data size of the first data packet;
- determine airtimes to transmit previously sent data packets associated with the second quality of service profile and data sizes thereof;
- determine a second average airtime consumed per data unit based on the airtimes to transmit previously sent data packets associated with the second quality of service profile and the data sizes thereof;
- determine the estimated airtime for transmitting the second data packet based on the second average air time consumed per data unit and a data size of the second data packet.

* * * * *